(12) United States Patent
Habele

(10) Patent No.: US 7,108,110 B2
(45) Date of Patent: Sep. 19, 2006

(54) BRAKE DEVICE FOR AN ELECTRIC MOTOR

(75) Inventor: Michael Habele, Waldenbuch (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/507,997

(22) PCT Filed: Dec. 11, 2003

(86) PCT No.: PCT/DE03/04102

§ 371 (c)(1),
(2), (4) Date: Sep. 16, 2004

(87) PCT Pub. No.: WO2004/088820

PCT Pub. Date: Oct. 14, 2004

(65) Prior Publication Data

US 2005/0199453 A1 Sep. 15, 2005

(30) Foreign Application Priority Data

Apr. 1, 2003 (DE) ................................ 103 14 887

(51) Int. Cl.
H02K 7/12 (2006.01)
(52) U.S. Cl. .................... 188/156; 188/158; 310/77; 310/91
(58) Field of Classification Search .......... 310/77–105; 188/156–164
See application file for complete search history.

(56) References Cited

U.S. PATENT DOCUMENTS 6,326,710 B1 * 12/2001 Guenther et al. ............. 310/77
6,731,034 B1 * 5/2004 Habele et al. ................ 310/77
2005/0179330 A1 * 8/2005 Habele ........................ 310/77

FOREIGN PATENT DOCUMENTS

| DE | 971 331 | 1/1959 |
| DE | 32 14 781 | 11/1983 |
| DE | 198 60 396 A1 | 6/2000 |
| EP | 0 043 498 A1 | 1/1982 |
| GB | 989868 | 4/1965 |

* cited by examiner

Primary Examiner—Christopher P. Schwartz
(74) Attorney, Agent, or Firm—Michael J. Striker

(57) ABSTRACT

The invention is based on a braking device for an electric motor with a stator (14, 16, 18) and a rotor (10), in particular for a direct current series-wound motor, with a braking element (20) that can be moved between an operating position and a braking position depending on a magnetic flux in the stator (14, 16, 18), wherein there is an air gap (32) between the braking element (20) and the stator (14, 16, 18), and with a short-circuit ring (38) for suppressing mechanical vibrations. The invention proposes that the short-circuit ring (38) be inclined in relation to the air gap (32) between the stator (14, 16, 18) and the braking element (20).

12 Claims, 2 Drawing Sheets

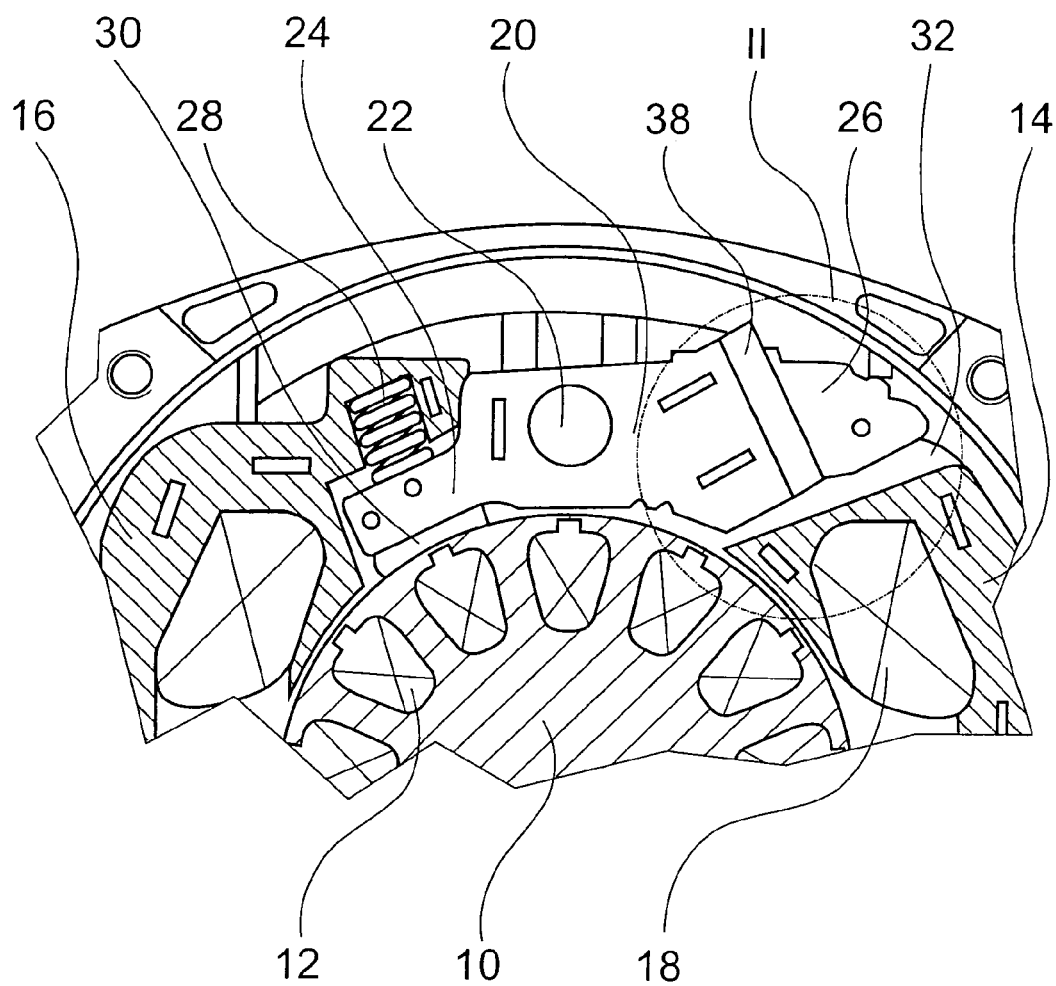
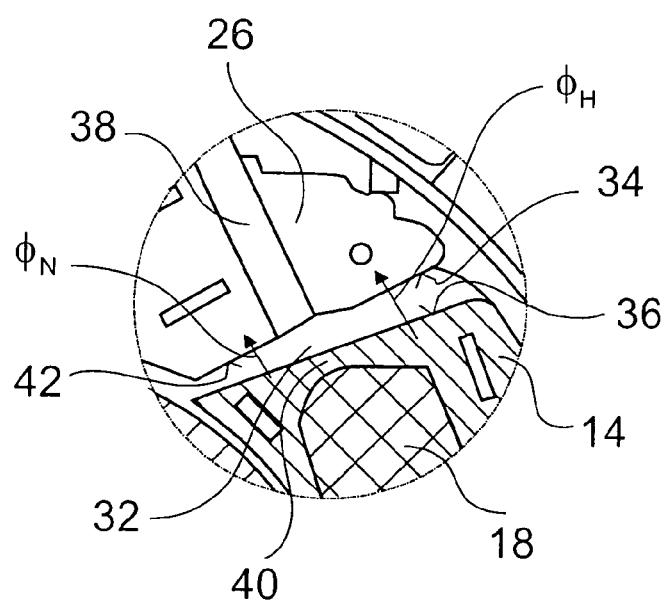
Fig. 1
Fig. 2

BRAKE DEVICE FOR AN ELECTRIC MOTOR

BACKGROUND OF THE INVENTION

The invention is based on a braking device for an electric motor.

DE 198 60 396 A1 has disclosed a braking device for an electric motor that brakes a rotor of the electric motor in the off state. To this end, the known braking device has a braking element in the form of a two-ended lever, with a braking arm and a releasing arm; a spring prestresses the braking arm in the direction toward the rotor so that it brakes the rotor in the off state. When the electric motor is in the on state, however, a stator winding of the electric motor is supplied with current, which attracts the releasing arm of the braking element so that the braking arm is lifted away from the rotor counter to the spring tension and thus releases the rotor. Between the yoke of the stator and the releasing arm of the braking element, there is an air gap whose width depends on the position of the braking element. In addition, a short-circuit ring is press-fitted into an impact surface of the releasing arm, extending in the impact surface of the releasing arm, parallel to the air gap.

SUMMARY OF THE INVENTION

The invention improves the mechanical durability of the above-described known braking device in that the short-circuit ring is mounted so that it is inclined in relation to the air gap, which involves several advantages.

On the one hand, the inclined orientation of the short-circuit ring in relation to the air gap permits a more intimate mechanical connection between the short-circuit ring and the releasing arm of the braking element, which increases the mechanical durability.

On the other hand, with the inclined orientation of the short-circuit ring in relation to the air gap according to the invention, usually only a part of the short-circuit ring is situated in the air gap, which is subjected to mechanical stress, while the rest of the short-circuit ring is subjected to less mechanical stress.

Another advantage of the orientation of the short-circuit ring according to the invention is that virtually the entire magnetic flux passing through the releasing arm and the braking element can also be conveyed through the short-circuit ring, thus allowing the short-circuit ring to effectively suppress vibrations (zero passages in alternating current).

In an operating position of the braking element, the short-circuit ring is preferably oriented essentially at right angles to the air gap, the short-circuit ring preferably encompassing the entire releasing arm of the braking element. This orientation of the short-circuit ring has the above-mentioned advantage that the entire magnetic partial flux passing through the releasing arm, which is referred to here as the main flux, also flows through the short-circuit ring.

Another partial flux, referred to here as the secondary flux, is not impeded by the short-circuit ring and flows through the so-called "bottleneck" and, downstream of the short-circuit winding, is employed to attract the braking element. In order to simplify representation of the function of the short-circuit ring, the magnetic flux is divided into the partial fluxes of the main flux and the secondary flux. The main flux passes through the surface encompassing the short-circuit ring, the secondary flux flows through the bottleneck in the leading pole horn and is also employed to attract the braking element across the additional air gap downstream of the short-circuit ring.

The main flux, impeded by the frequency, induces a current in the short-circuit ring. This current in turn generates a field that counteracts the original field that generated it. This produces a phase shift in relation to the unimpeded secondary flux. If the main flux and secondary flux are then added, as in the description given above, this eliminates the zero passage. The mechanical oscillations of 100 Hz are suppressed.

The invention is not limited to the orientation of the short-circuit ring at right angles in relation to the air gap. The short-circuit ring and the air gap can also enclose angles of less than 90°.

Preferably, however, the short-circuit ring is placed so that only a part of the short-circuit ring is subjected to the mechanical stresses that occur when the impact surface of the releasing arm strikes the yoke of the stator. This can be achieved by situating only part of the short-circuit ring in the air gap while the rest of the short-circuit ring is situated outside the air gap.

It is desirable for as much as possible of the magnetic flux passing through the braking element or the releasing arm of the braking element to also pass through the short-circuit ring. In actual practice, however, the magnetic flux passing through the braking element is comprised of a main magnetic flux that passes through the short-circuit ring and a secondary magnetic flux that bypasses the short-circuit ring.

This ratio between the secondary magnetic flux and the main magnetic flux can be achieved, among other things, by making the air gap between the braking element or the releasing arm of the braking element and the stator or the yoke of the stator smaller in the region of the main magnetic flux than in the region of the secondary magnetic flux. In this way, the air gap in the region of the secondary magnetic flux constitutes a greater magnetic resistance than in the region of the main magnetic flux, which suppresses the secondary magnetic flux.

The braking element or the releasing arm of the braking element therefore preferably has a boundary surface in relation to the air gap, which in the region of the secondary magnetic flux, is recessed in relation to the region of the main magnetic flux in order to increase the size of the air gap.

In a preferred exemplary embodiment of the braking device according to the invention, the stator has a magnetically conductive yoke and a stator winding; between the stator winding and the air gap in relation to the braking element, the yoke has a bottleneck, which reaches saturation early so that the main magnetic flux bypasses the bottleneck while the secondary magnetic flux passes through the bottleneck.

This placement results in a predetermined ratio between the secondary magnetic flux and the main magnetic flux when the bottleneck is operated in the saturation range.

The bottleneck is always at saturation; only the main flux decreases.

In order to correct for this change, the air gap in the region of the secondary magnetic flux is preferably enlarged as has been described above.

It should also be noted here that the short-circuit ring is preferably situated in the region of the bottleneck of the yoke so that the magnetic flux must pass through the bottleneck in order to bypass the short-circuit ring.

Preferably, the braking element is embodied as a pivoting lever with a braking arm and a releasing arm, as was explained at the beginning in relation to the prior art. The disclosure DE 198 60 396 A1 mentioned above in the introduction to the specification is therefore included in its entirety in the present specification with regard to the embodiment of the braking device.

It should also be mentioned that the short-circuit ring is preferably at least partially caulked or welded to the braking element. To this end, spherical indents can be incorporated into spur part packets in the region of the short-circuit ring.

In a preferred exemplary embodiment, however, the short-circuit ring is welded to the braking element, which makes it possible to achieve a particularly high degree of mechanical durability. The welding of the short-circuit ring to the braking element here is preferably only performed on one side, on the side of the short-circuit ring oriented away from the air gap.

The short-circuit ring is preferably welded to the braking element by means of a welding method that prevents a rapid flow of heat since the short-circuit ring is comprised of highly conductive copper and the braking element is usually comprised of laminated steel.

A TIG method with a predetermined, precisely defined welding speed turns out to be advantageous for this purpose. The parts to be welded are preferably clamped in a welding tool in which the mass distribution of the clamping elements has been optimized so that the thermal influence zone in the copper and in the laminated steel of the braking element are as equivalent as possible.

BRIEF DESCRIPTION OF THE DRAWINGS

Other advantages ensue from the following description of the drawings.

The drawing shows an exemplary embodiment of the invention. The drawings, the specification, and the claims contain numerous features in combination. A person skilled in the art will also suitably consider the features individually and unite them in other meaningful combinations.

FIG. 1 shows a cross section through a braking device according to the invention for an electric motor, FIG. 2 shows an enlarged cross-sectional view of the braking device from FIG. 1 in the region of an air gap.

DETAILED DESCRIPTION OF THE PREFERRED EMBODIMENTS

Figure 3A:
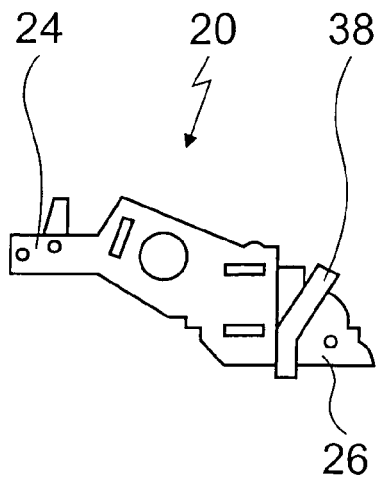
FIGS. 3a–3c show side views of a braking element of the braking device from FIG. 1 in various stages of assembly.

In the cross-sectional view in FIG. 1, a rotor 10 of an electric motor is depicted; a number of rotor windings 12 are situated on the outside of the essentially cylindrical rotor 10.

In addition, two yoke parts 14, 16 of an associated stator are shown; the yoke parts 14, 16 conduct the magnetic flux generated by a stator winding 18.

In addition, the magnetic flux generated by the stator winding 18 is also conveyed by a braking element 20 that is supported so that it can pivot around a pivot axis 22; the braking element 20 is embodied as a two-ended lever that has a braking arm 24 and a releasing arm 26.

The braking arm 24 is prestressed by a spring 28 that rests against the yoke part 16 and presses the braking arm 24 radially inward against the rotor 10; a brake lining 30 is situated between the braking arm 24 and the rotor 10.

Between the releasing arm 26 and the yoke part 14, however, there is an air gap 32 whose width depends on the position of the braking element 20. Thus, in the brake position shown in FIG. 1, the air gap 32 is relatively large, whereas the air gap 32 is thinner when the braking element 20 is pivoted clockwise around the pivot axis 22 from the braking position shown in FIG. 1 into the operating position.

To achieve this, the stator winding 18 is supplied with current so that a magnetic flux is produced in the yoke parts 14, 16; the magnetic flux in the yoke part 16 travels into the magnetically conductive braking element 20 and from there, into the rotor 10, whereas the magnetic flux in the yoke part 14 travels via the air gap 32 into the braking element 20 and from there, into the rotor 10. The magnetic flux in the air gap 32 produces an attractive force between the releasing arm 26 and the yoke part 14 so that the braking element 20 rotates clockwise around the pivot axis 22 until an impact surface 34 on the releasing arm 26 strikes against a corresponding impact surface 36 on the yoke part 14 when the braking element 20 assumes its operating position. In the operating position, the braking arm 24 is then lifted away from the rotor 10 counter to the initial stress of the spring 28 so that the brake lining 30 releases the rotor 10.

The braking element 20 also has a short-circuit ring 38 that encompasses the releasing arm 26 and has the task of suppressing mechanical vibrations in the operating position of the braking element 20.

The short-circuit ring 38 completely encompasses the releasing arm 26 of the braking element 20 so that the magnetic flux flowing through the releasing arm 26 of the braking element 20 passes almost completely through the short-circuit ring 38, which results in a very favorable suppression of mechanical vibrations.

It should be noted here that the short-circuit ring 38 is oriented essentially at right angles to the air gap 32 so that only part of the short-circuit ring 38 is situated in the air gap 32 and exposed to mechanical stresses, whereas the remainder of the short-circuit ring 38 is situated on top of the releasing arm 26 where hardly any mechanical stresses occur.

In addition, between the air gap 32 and the stator winding 18, the yoke part 14 has a bottleneck 40 that constitutes a magnetic resistance in the yoke part 14. It should be noted in this context that the magnetic flux in the yoke part 14 is divided into a main magnetic flux $\phi_H$ and a secondary magnetic flux $\phi_N$; the main magnetic flux $\phi_H$ bypasses the bottleneck 40 and passes completely through the short-circuit ring 38 whereas the secondary magnetic flux $\phi_N$ passes through the bottleneck 40 and bypasses the short-circuit ring 38. The magnetic resistance of the bottleneck 40 thus contributes to the fact that the secondary magnetic flux $\phi_N$ is significantly weaker than the desired main magnetic flux $\phi_H$.

This is further encouraged by the fact that in the vicinity of the secondary magnetic flux $\phi_N$, the releasing arm 26 has an impact surface 42 that is recessed in relation to the impact surface 34 in the region of the main magnetic flux $\phi_H$. This makes the air gap 32 in the region of the secondary magnetic flux $\phi_N$ larger than in the region of the main magnetic flux $\phi_H$, which results in a suppression of the secondary magnetic flux $\phi_N$.

Figure 4A:
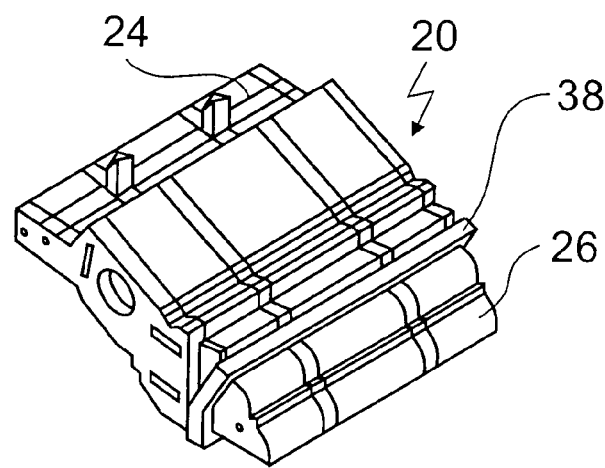
FIGS. 4a–4c show perspective views of the braking element from FIGS. 3a–3c during the different stages of assembly.
Figure 3B:
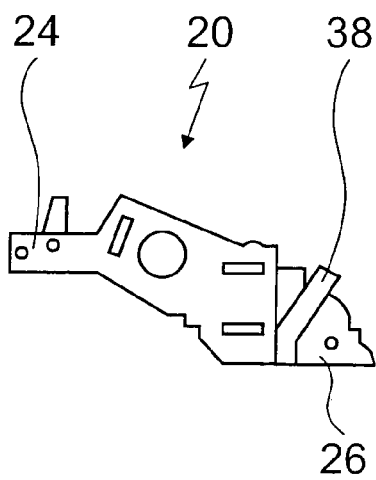
Figure 4B:
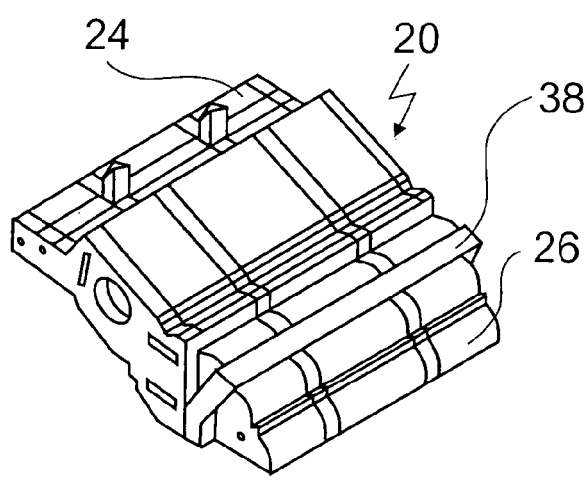
Figure 3C:
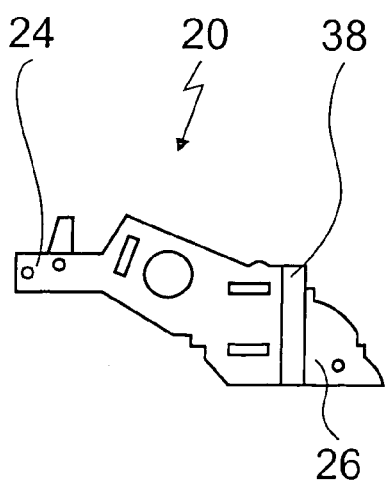
Figure 4C:
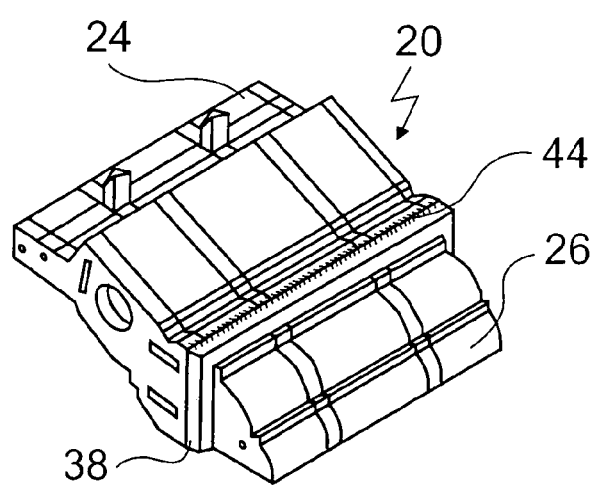

FIGS. 3a–3c and 4a–4c show the braking element 20 in various assembly stages, beginning with FIGS. 3a and 4a, and ending with FIGS. 3c and 4c. It is clear from these depictions that the short-circuit ring 38 is pressed fitted onto the releasing arm 26 from underneath and then bent into place.

Finally, on the top side of the releasing arm 26, the short-circuit ring 38 is attached to the braking element 20 by means of a welding seam 44.

The invention is not limited to the above-described preferred exemplary embodiment. A large number of variations and modifications are possible that also make use of the concept of the invention and therefore remain within its scope.

REFERENCE NUMERALS 10 rotor
12 rotor winding
14 yoke part
16 yoke part
18 stator winding
20 braking element
22 pivot axis
24 braking arm
26 releasing arm
28 spring
30 brake lining
32 air gap
34 impact surface
36 impact surface
38 short-circuit ring
40 bottleneck
42 impact surface
44 welding seam

The invention claimed is:

1. A braking device for an electric motor with a stator (14, 16, 18) and a rotor (10) composing: a braking element (20) that can be moved between an operating position and a braking position depending on a magnetic flux in the stator (14, 16, 18), wherein there is an air gap (32) between the braking element (20) and the stator (14, 16, 18), and with a short-circuit ring (38) for suppressing mechanical vibrations, wherein a surface enclosed by the short-circuit ring (38) is inclined in relation to a boundary surface (42) of the braking element (20) in relation to the air gap (32) between the stator (14, 16, 18) and the braking element (20), wherein the magnetic flux traveling through the braking element (20) is comprised of a main magnetic flux ($I_H$) flowing through the short-circuit ring (38) and a secondary magnetic flux ($I_N$) that bypasses the short-circuit ring (38), and wherein the air gap (32) between the braking element (20) and the stator (14, 16, 18) is smaller in the region of the main magnetic flux ($I_H$) than in the region of the secondary magnetic flux ($I_N$).

2. The braking device according to claim 1, wherein the surface enclosed by the short-circuit ring (38) is oriented essentially at right angles to the boundary surface (42) of the braking element (20) in relation to the air gap (32) in the operating position of the braking element (20).

3. The braking device according to claim 1, wherein the boundary surface (42) is recessed in the region of the secondary magnetic flux ($I_N$) in relation to the region of the main magnetic flux ($I_H$) in order to increase the size of the air gap (32).

4. The braking device according to claim 1, wherein the stator (14, 16, 18) has a yoke (14, 16) and a stator winding (18), wherein between the stator winding (18) and the air gap (32) in relation to the braking element (20), the yoke (14, 16) has a bottleneck (40) that represents a magnetic resistance in the yoke (14) so that the main magnetic flux ($I_H$) bypasses the bottleneck (40) while the secondary magnetic flux ($I_N$) passes through the bottleneck (40) until it reaches saturation.

5. The braking device according to claim 4, wherein the short-circuit ring (38) is situated in the region of the bottleneck (40) of the yoke (14).

6. The braking device according to claim 1, wherein the braking element (20) is embodied as a pivoting lever with a braking arm (24) and a releasing arm (26).

7. The braking device according to claim 6, wherein the short-circuit ring (38) encompasses the entire releasing arm (26) of the braking element (20).

8. The braking device according to claim 1, wherein the short-circuit ring (38) is at least partially caulked or welded to the braking element (20).

9. The braking device according to claim 8, wherein the short-circuit ring (38) is welded to the braking element (20) on the side oriented away from the air gap (32).

10. An electric motor with a braking device according to claim 1.

11. A machine tool with an electric motor according to claim 10.

12. The braking device according to claim 1, wherein the electric motor is a direct current series-wound motor.

* * * * *